April 15, 1952 — J. E. TAYLOR ET AL — 2,592,762

SEPARATION OF CARBON DIOXIDE FROM GASES

Filed Jan. 24, 1946

INVENTORS
James E. Taylor
John H. Haslam
BY
Synnestvedt & Lechner

Patented Apr. 15, 1952

2,592,762

UNITED STATES PATENT OFFICE 2,592,762

SEPARATION OF CARBON DIOXIDE FROM GASES

James E. Taylor, Boonton, N. J., and John H. Haslam, Newport, Del., assignors to The Girdler Corporation, Louisville, Ky., a corporation of Delaware Application January 24, 1946, Serial No. 643,123

6 Claims. (Cl. 23—150)

This invention relates to the separation of acidic gases from gaseous mixtures containing the same, through the use of amines as an absorbent agent, and, in this respect, it is an improvement upon the process for separating acidic gases disclosed in the United States patent to R. R. Bottoms, Reissue No. 18,958.

The nature, objects and advantages of the invention will appear from the following brief description of the process of said patent. In the apparatus illustrated in that patent, the gaseous mixture to be "stripped" of the acidic gas is led into an absorber, such as a tower, in which it is intimately subjected, in counterflow, to an aqueous solution of an amine. The stripped gases are withdrawn from the top of the tower, and the "rich" aqueous amine solution is withdrawn at the bottom and conditioned for re-use.

It has been found that when that process is employed, for example, to remove carbon dioxide through the use of monoethanolamine, the carbon dioxide is effectively absorbed from the gases, but a fog sometimes is formed which is withdrawn from the top along with the stripped or "sweet" gas. The fog contains monoethanolamine, but the amount of that amine in the fog varies over wide ranges. Surprisingly, in some plants, the amount of monoethanolamine in the fog was found to be relatively small while in others the amount was quite substantial (up to as much as 50%), notwithstanding the concentration of the original absorbing solution was the same (usually about 15%). In consequence, there was objectionable loss of monoethanolamine in many plants. Monoethanolamine, in addition to being an effective absorbent agent, has marked advantages from an operation standpoint. It is, however, relatively expensive. Hence the loss due to fogging may, in some instances, render the use of monoethanolamine uneconomical and may entail the use of other amines which, however, may not have the same operational advantages as monoethanolamine for some applications. Heretofore many attempts have been made to recover the monoethanolamine from the fog where such fogging conditions have been encountered but without success.

Among the primary objects of the present invention is to overcome such fogging and to reduce the loss of amine resulting from fogging.

In general, we accomplish the desired result by subjecting the effluent gas from the absorber comprised of the stripped gas and the fog, to a treatment which breaks the fog and effects a separation of the fog-forming constituents from the stripped or sweet gas and thus a recovery of the amine.

An ancillary object of the invention is to accomplish the foregoing in a manner such that the separated fog-forming constituents and the medium employed in the separation, can be re-used in the system and thus aid in maintaining the materials balance.

How the foregoing, together with such other objects and advantages as may hereinafter appear or are incident to our invention, are realized is illustrated in the accompanying drawings, wherein—

Although our present invention may be employed to advantage whenever there may be encountered fogging conditions such as hereinbefore mentioned, we will describe the invention for purposes of illustration as applied to elimination of fogging in the removal of carbon dioxide with monoethanolamine.

Figure 1:
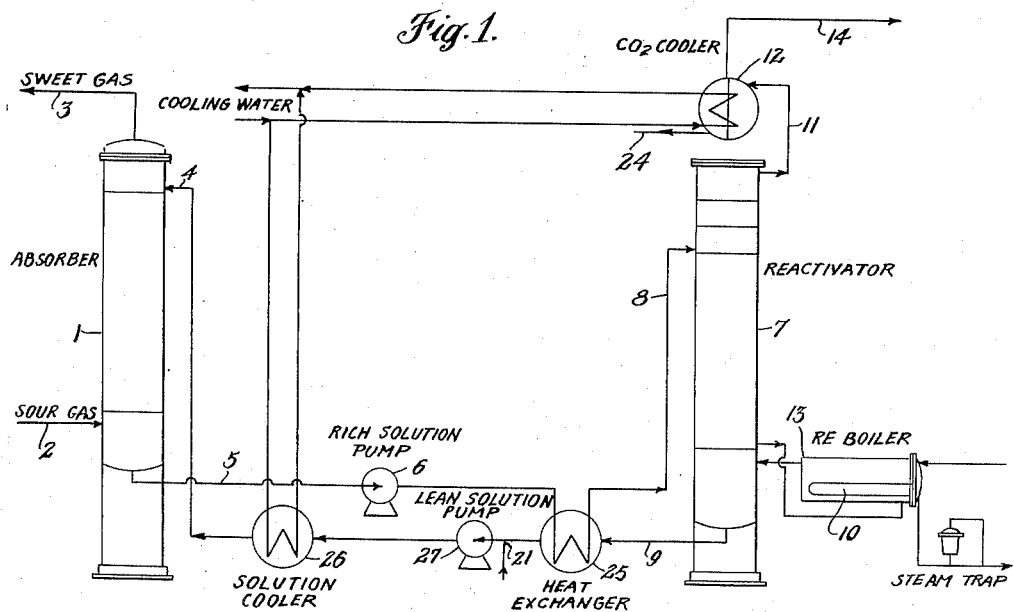
Fig. 1 is a diagrammatic illustration of a conventional installation for the separation of acidic gases.

Referring now to Figure 1, the raw gas containing carbon dioxide is delivered to the lower portion of the absorber or tower 1 through line 2, and the sweet gas and fog, substantially free of carbon dioxide, leave the top of the absorber through line 3. In the absorber the raw gas is intimately contacted, in counterflow, with "lean" monoethanolamine-water solution which enters the top of the absorber through pipe 4 after having been stripped of carbon dioxide previously absorbed therein. To this end the interior of the absorber is provided with bubble plates, baffles, pebbles, Raschig rings, or other suitable filler (not shown) to effect reduced rate of flow and efficient contact of the downflowing liquid and the upflowing gas.

The "rich" solution, containing carbon dioxide, scrubbed from the raw gas, is withdrawn from the bottom of the absorber through the line 5 and pumped, as by pump 6, through line 8 and heat exchanger 25, to the upper portion of the reactivator or regenerator 7. The solution in reactivator 7 is heated in any suitable manner, as by the steam coil 10, in reboiler 13 in order to expel the carbon dioxide from the solution. The interior of the reactivator may be of any suitable and conventional form, either the same as or different than that of the absorber. The lean solution, freed of carbon dioxide, is now in condition for return to the absorber and is pumped by means of pump 27 from the lower portion of the reactivator via line 9 through heat exchanger 25 and solution cooler 26, and thence into line 4.

The liberated carbon dioxide, together with some steam, leaves the upper part of the reactivator through line 11 and is passed through the condenser 12 of conventional construction, where the steam is condensed. The carbon dioxide leaves the condenser through pipe 14. The condensate in the condenser generally contains somewhat less than 1% monoethanolamine, and is withdrawn from the condenser through pipe 24. In some plants, the condensate is led from the condenser directly to the upper portion of the reactivator to assist in maintaining the materials balance. However, in some instances in the carrying out of the present invention, it may be desirable not to return the condensate to the top of the reactivator for reasons which will appear hereinafter.

In the carrying out of the process as so far described with reference to Fig. 1, the absorbent solution may be of any suitable amine concentration in accordance with well known practice. A 15% monoethanolamine-85% water solution is one commonly employed and found to be satisfactory. It is to be understood, however, that the apparatus illustrated in Fig. 1 and the procedure for absorption of acidic gases with amine solutions and for regeneration of such solutions, as outlined hereinbefore in connection with the description of Fig. 1, form no part of the present invention, and the invention is not limited to application with such apparatus or procedure.

Referring now more particularly to the elimination of fogging and the recovery of the amine in the effluent mixture of sweet gas and fog from the absorber, in accordance with the present invention, we have found that by heating such effluent mixture to a temperature substantially higher than that at which it leaves the absorber, as discussed more in detail hereinafter, and then cooling said effluent, the fog is destroyed and there is obtained a recovery of 50% or more of the monoethanolamine which would otherwise be lost. We also have found, as a further feature of our invention, that if such heating of the effluent mixture is followed by scrubbing of the mixture with suitable liquid, a still greater recovery of the amine may be obtained, i. e., up to 90-95% or more of the monoethanolamine which otherwise would be lost. In this latter case the scrubbing liquid may serve as the cooling medium.

The heating of the effluent mixture may be accomplished indirectly, or directly by the injection of steam or warm inert gas into the effluent mixture. In the case of indirect heating, when followed by cooling, very pronounced benefits in respect to amine recovery are obtained even without the scrubbing of the effluent mixture, but, as above indicated, still more pronounced benefits may be obtained if the heating step is followed by scrubbing. On the other hand, when the heating is accomplished by injection of steam directly into the effluent mixture, scrubbing is important since injection of steam in itself apparently does not entirely destroy the fog but conditions it so that subsequent scrubbing will effectively eliminate the fog. The principles underlying these operations are not entirely understood, but in any case it has been conclusively demonstrated that by following the procedures above outlined, and as described more in detail hereinafter, the desired results are obtained to a highly satisfactory degree.

The manner of carrying out our invention with indirect heating of the effluent mixture discharging from the absorber 1 of Fig. 1, now will be described with reference more particularly to the arrangement shown in Fig. 2.

Figure 2:
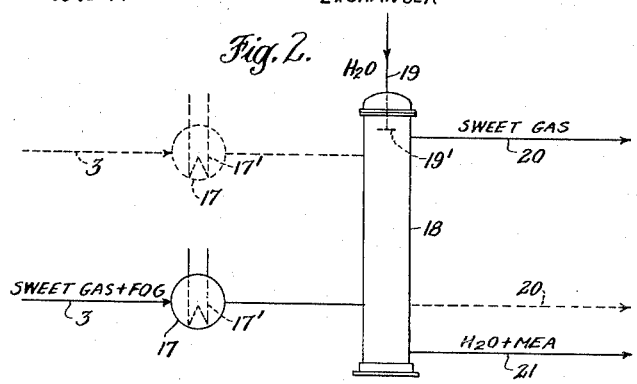
Fig. 2 is a diagrammatic illustration of equipment to be coupled therewith for carrying out the present invention.

In such arrangement, the effluent mixture is led from line 3 to a heater 17 which may be heated indirectly in any suitable manner, as by the application of external heat to the heater, or by internal steam pipes such as indicated at 17' in Fig. 2. The interior of the heater may be provided with baffles or other suitable means for effecting distributed flow of the gas mixture therethrough and insuring efficient heating of the gas. After leaving the heater the mixture may be cooled in any suitable manner and substantial benefits obtained thereby in respect to fog elimination and amine recovery, since as above indicated, up to 50% or more of the amine may be recovered by simply heating and cooling in accordance with the present invention, without the scrubbing operation. However, in order to secure maximum benefits, the mixture is led from heater 17 to a scrubbing tower 18 in which it is intimately contacted with a cooling and scrubbing liquid introduced into the upper portion of tower 18 through line 19. The interior of the scrubbing tower may be substantially the same as that of absorber 1, or it may be substantially smaller and void of any filler, in which latter case the cooling and scrubbing liquid may be introduced into the tower 18 in the form of a finely divided spray through a spray head 19' connected with line 19. The mixture from heater 17 may be introduced into the lower part of tower 18, as indicated in solid lines in Fig. 2, for flow of the mixture upwardly countercurrently to the downwardly flowing scrubbing liquid, in which case the scrubbed sweet gas is discharged from the upper part of tower 18 through line 20 indicated in solid lines in Fig. 2. Alternatively, the mixture from heater 17 may be introduced into the upper part of tower 18, as indicated in broken lines in Fig. 2, for flow downwardly concurrently with the scrubbing liquid, in which latter case the scrubbed sweet gas is withdrawn adjacent the bottom of tower 18 through the line 20 indicated in broken lines in Fig. 2. Although a separate cooling means may be employed, it is satisfactory and more efficient to employ the scrubbing liquid in tower 18 as the cooling medium. In such case, the scrubbing liquid condenses the fog-forming constituents and scrubs them and the amine out of the gas in the tower 18. The scrubbed sweet gas then leaves the tower through line 20 as previously indicated, and the liquid discharges from the lower part of the scrubber through line 21. This liquid will contain substantially all of the amine previously contained in the effluent mixture from the absorber.

It is desirable to use water as the scrubbing liquid. Such water may be obtained from any suitable source, but we prefer to connect line 19 with the discharge 24 from condenser 12 so as to use the condensate from the condenser 12 as the scrubbing liquid, because thereby the liquid discharging from the scrubber is an aqueous solution of monoethanolamine such that it can be directly returned into a suitable place in the system, as, for example, by the pipe 21 into line 9—4 of Fig. 1, and thus aid in maintaining the materials balance. To this end it is also desirable to use an indirect type of heating for the heater 17 as thereby nothing external is introduced into the system. The condensate will effectively absorb the monoethanolamine in the scrubber 18. As an alternate to employing the condensate from condenser 12 as the scrubbing liquid, a portion of the lean amine solution can be by-passed from line 9—4 and delivered in any suitable manner to scrubber 18 so as to serve as the scrubbing liquid.

By the heating operation above described, the fog is broken or substantially broken in the heater. The immediately ensuing scrubbing and cooling prevents any reformation of fog and recovers the monoethanolamine as hereinbefore described, for reuse in the system. While loss of monoethanolamine may not be completely eliminated, we have found that in all cases the loss is now so small as to be negligible. Therefore, it is only necessary at long intervals to replenish the system in monoethanolamine.

Figure 3:
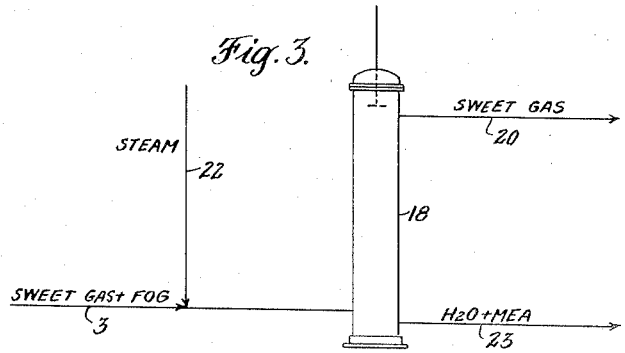
Fig. 3 is a diagrammatic view illustrating a modified form of equipment which may be coupled to the system of Figure 1 for carrying out the invention.

Referring now to the modification shown in Figure 3, we here employ direct heating. To this end, steam may be led by pipe 22 directly into the line 3 in advance of scrubber 18, the heater 17 being omitted in this arrangement and the heat being derived directly from the steam. Then follows the scrubbing and cooling in the scrubber 18 as before described. Such scrubbing may be effected with either counter-current or concurrent flow of the effluent mixture relative to the scrubbing liquid as in the embodiment previously described, although, for purposes of illustration, the apparatus shown in Figure 3 is arranged for counter-current flow. With direct heating by injected steam, it may in some cases be undesirable to return to the system the liquid discharging from the scrubber through pipe 23, because of the introduction of substantial additional amounts of water through the use of the steam and the consequent dilution of the amine absorbent solution. In such cases, the scrubbing liquid leaving the scrubber may be concentrated, as by distillation, in order to recover the monoethanolamine for reuse.

In the embodiment of Figure 3, the direct heating also may be accomplished by injecting warm inert gas other than steam, as, for example, nitrogen, through pipe 22 into the effluent mixture flowing in line 3. This would be followed by cooling and scrubbing as previously described. With this type of direct heating, however, the liquid discharging from the scrubber through line 23 may be returned to the system without undesirable dilution of the amine absorbent solution. Alternately, a portion of the sweet gas leaving via pipe 20 may be heated and introduced through pipe 22 instead of steam.

Referring to both Figures 2 and 3, the temperature required to dispel or break the fog will vary, as will now appear. The temperature of the effluent mixture leaving the absorber will vary in different plants, depending upon the particular operating conditions and other factors. We have found that if the temperature of the effluent mixture be raised about 15° C. to about 25° C. higher than the temperature at which the effluent mixture leaves the absorber, the desired results are obtained. In other words, it is not the temperature per se, but the amount of increase in temperature after the effluent leaves the absorber which is important. As stated, the mixture should be heated to a temperature at least substantially 15° C. higher than the temperature of the mixture leaving the absorber. Ordinarily, above a 25° C. rise, nothing useful seems to be gained. One may go higher at sacrifice in economy unless waste heat is available.

It is, of course, to be understood that the invention is in no sense limited to the particular apparatus shown, which may vary widely, so long as the effluent mixture is heated and scrubbed with cooling.

It is also to be understood that the invention is applicable to the separation of gases other than carbon dioxide, to the separation of a mixture of gases (such, for example, as mixed gases containing carbon dioxide), from the gas to be purified, and to the use of absorbing agents other than monoethanolamine where substantially the same fogging conditions as before described, are encountered.

We claim:

1. In a process for separating carbon dioxide from a gaseous mixture containing the same, in which the mixture is contacted in an absorber with an aqueous solution of monoethanolamine and in which the effluent gas comprises a mixture of the stripped gas and a fog containing monoethanolamine, the method of separating the fog from the stripped gas which comprises the steps of heating the effluent gas to a temperature at least 15° C. above that of the effluent gas leaving the absorber, and then cooling the effluent gas by scrubbing the effluent gas with a spray of an aqueous cooling liquid.

2. A process according to claim 1 in which the heating of the effluent gas is effected indirectly through a heat exchange surface.

3. The process according to claim 1 in which the heating of the effluent gas is effected directly by intermixing the effluent gas with a heated gaseous medium.

4. In a process for separating carbon dioxide from a gaseous mixture containing the same, in which the mixture is contacted in an absorber with an aqueous solution of monoethanolamine and in which the effluent gas comprises a mixture of the stripped gas and a fog containing monoethanolamine, the method of separating the fog from the stripped gas which comprises the step of heating the effluent gas to a temperature at least 15° C. above that of the effluent gas leaving the absorber, then cooling the effluent gas by scrubbing the effluent gas with a spray of an aqueous cooling liquid, and returning the solution resulting from the scrubbing into the system for recycling.

5. In a process for separating carbon dioxide from a gaseous mixture containing the same, in which the gas is treated in an absorber with an aqueous solution of monoethanolamine to absorb the carbon dioxide and in which the stripped gas is withdrawn along with fog concomitantly produced in said treatment and in which the rich absorbing solution is heat regenerated and the gaseous effluent of the regenerator cooled to produce an aqueous condensate, the steps of heating the effluent mixture of stripped gas and fog to a temperature at least 15° C. above that at which it leaves the absorber and then cooling the effluent gas by scrubbing the effluent gas with a spray of an aqueous cooling liquid, utilizing the condensate obtained in cooling the effluent from the regenerator for the said scrubbing operation, and returning the solution resulting from the scrubbing into the system for recycling.

6. The process of separating carbon dioxide from a gaseous mixture containing the same, while maintaining a substantial balance of materials in the system, which comprises subjecting the gas to an aqueous solution of monoethanolamine in an absorber, withdrawing the stripped gas along with the fog concomitantly produced, withdrawing the rich absorbing solution and heat regenerating the same in a regenerator, returning the regenerated absorbing solution to the system for recycling, passing the gaseous effluent of the regenerator through a condenser to condense out the water along with the monoethanolamine therein contained, heating the effluent mixture of gas and fog withdrawn from the absorber to a temperature at least 15° C. above that at which it leaves the absorber, then cooling the effluent gas by scrubbing the effluent gas with a spray of an aqueous cooling liquid, utilizing the condensate obtained from the condenser for the said scrubbing operation, and returning the solution resulting from the scrubbing to the system for recycling.

JAMES E. TAYLOR.
JOHN H. HASLAM.

REFERENCES CITED

The following references are of record in the file of this patent:

UNITED STATES PATENTS

| Number | Name | Date |
|---|---|---|
| Re. 18,958 | Bottoms | Sept. 26, 1933 |
| 684,854 | Ostergren | Oct. 22, 1901 |
| 1,284,176 | Bradley | Nov. 5, 1918 |
| 1,390,410 | Webster | Sept. 13, 1921 |
| 1,490,588 | Calder et al. | Apr. 15, 1924 |
| 1,622,134 | Dumors et al. | Mar. 22, 1927 |
| 1,851,163 | Daugherty | Mar. 29, 1932 |
| 1,934,472 | Allen et al | Nov. 7, 1933 |
| 2,106,446 | Baehr et al. | Jan. 25, 1938 |
| 2,142,917 | Reich | Jan. 3, 1939 |
| 2,143,393 | Ulrich | Jan. 10, 1939 |
| 2,298,139 | Long et al. | Oct. 6, 1942 |
| 2,333,193 | Persson et al. | Nov. 2, 1943 |
| 2,377,966 | Reed | June 12, 1945 |
| 2,399,142 | Reed | Apr. 23, 1946 |

OTHER REFERENCES

J. Ind. & Eng. Chem., vol. 29, pp. 514–519.